United States Patent Office 2,759,860
Patented Aug. 21, 1956

2,759,860

LINT REMOVING PROCESS

John L. Pallos, Gary, Ind.

No Drawing. Application September 14, 1953,
Serial No. 380,113

2 Claims. (Cl. 134—6)

The present invention relates to a process for removing lint from fabrics.

The primary object of the invention is to provide a lint removing process that will remove lint adhering to fabrics such as wool, velvet, as well as any other attracting fabric utilized in wearing apparel, suede shoes, hand bags and the like.

A very important object of the invention is to provide a lint removing process using a composition that will leave no odor after its application to a fabric surface which would tend to make the composition unusable on fabrics used for wearing apparel. Felt, flannels, serges and velvets are all extremely prone to the reception of lint either due to the presence of static electricity or otherwise, especially during the process of dry cleaning and tumbling, and the composition is particularly adaptable for fabrics of this nature since it will not harm the natural nap of the fabric, will leave no odor on the fabric, and will not adhere to the fabric.

A still further object of the invention is to provide a process using a composition that is waterproof and in the form of a semi-liquid adhesive which will not dry nor deteriorate through decomposition or oxidation, remaining stable for extremely long periods of time without losing its lint adhesive properties.

The composition constituting the present invention consists primarily of copal resin dissolved in a suitable medium to a semi-liquid consistency. The dissolving medium is preferably an odorless oil that will act as a solvent for the copal resin.

The copal resin utilized is the soft copal which is both odorless and tasteless. The preferred copal is a copal containing mancopalolic acid and a resin and substantially no volatile oils. Also, the soft copal is much more susceptible to an oil solvent than are the hard copals.

The preferred oil used as the solvent medium in the composition is preferably a purified castor oil to decrease the slight, though characteristic, odor of the oil to an absolute minimum.

The composition consists generally of approximately one pound of copal resin per approximately one quart of castor oil.

The oil dissolves the copal resin into a semi-liquid consistency providing the resin with excellent adhesive properties. Since there are no volatile ingredients in either the solvent or the solute, the resultant semi-liquid mass is extremely stable under ordinary conditions and will retain its consistency and its adhesive properties over extremely long periods of time.

The ingredients selected in the composition were selected primarily for their lack of odor, their stability and the excellent adhesive properties when mixed with one another. A further feature that had to be satisfied in the selection of the ingredients for the composition was the provision of a composition that could be easily removed from the medium with which it is applied to the fabric to remove the lint therefrom.

In using the composition, a brush or whisk broom or the like is lightly daubed with the composition which is "smeared" over the brush or whisk broom surface that is to come into contact with the fabric. The brush or whisk broom is then brushed over the fabric, allowing the lint to come in contact with the adhesive composition smeared on the applicator. The lint will readily adhere to the brush or whisk broom carrying the composition. When the whisk broom or brush has picked up sufficient lint to nullify the effective adhesive composition thereon, the lint may be removed by hand, pulling the composition with it, or the brush may be swished back and forth in petroleum naphtha, gasoline or other suitable dry cleaning liquid which will remove the lint and the adhesive composition from the whisk broom.

In mixing the composition, the castor oil should be first heated to approximately 425° F. and the resin granulated and added slowly to the oil, constantly stirring the mixture until the resin is dissolved. After the dissolving of the resin, the resultant solution should then be strained or filtered to remove impurities therefrom. Then, the mixture is cooled and packaged in any suitable manner.

Obviously, the amounts of the resin and castor oil with respect to one another can be varied as desired with the result that the composition will have either increased or decreased viscosity characteristics.

Under certain circumstances, it may be possible to vary the resin and the oil used, however, with such variations, it may result in an odorous product, or a non-stable product, or a non-removable product, or in a very inefficient lint adhesive composition.

From the foregoing, the composition and its utility are believed to be readily apparent. However, it is to be understood that minor variations in the ingredients and their proportions may be resorted to without departing from the spirit of the invention, and the invention is to be limited only as required by the appended claims.

What is claimed as new is as follows:

1. A process for removing lint from fabric surfaces which comprises wetting the bristles of a brush with a soft oil soluble copal resin substantially free from volatile oils and containing mancopalolic acid rendered semi-liquid by the addition of castor oil thereto and brushing the fabric surface with the wetted bristles.

2. The process of claim 1 wherein approximately 1 quart of castor oil is used per pound of copal.

References Cited in the file of this patent

UNITED STATES PATENTS

| | | |
|---|---|---|
| 488,562 | Holden | Dec. 27, 1892 |
| 1,448,927 | Luckenbach | Mar. 20, 1923 |
| 1,468,380 | French | Sept. 18, 1923 |
| 1,633,076 | Dorsey | June 21, 1927 |
| 2,188,439 | Kirkpatrick | Jan. 30, 1940 |
| 2,388,867 | Peterson | Nov. 13, 1945 |
| 2,693,610 | Hensley | Nov. 9, 1954 |

OTHER REFERENCES

"London Shellac Research Bureau" abstracts 1938, 33, page 33. (Copy in Div. 6.)